July 13, 1937.  S. C. LEONARD, JR  2,086,872
SEAL
Filed April 19, 1935

INVENTOR
SIMPSON C. LEONARD, JR
BY
La Rue W. Patee
ATTORNEY

Patented July 13, 1937

2,086,872

UNITED STATES PATENT OFFICE 2,086,872

SEAL

Simpson C. Leonard, Jr., Detroit, Mich.

Application April 19, 1935, Serial No. 17,196

3 Claims. (Cl. 288—1)

This invention relates to a lubricant seal such as is adapted to be positioned within a tubular housing about a rotatable shaft for preventing grease, oil or other lubricant from flowing between the shaft and the housing.

An object of the invention is to provide a self-contained sealing unit which is extremely simple in construction, can be manufactured inexpensively from a minimum number of parts and which will withstand the most severe usage and will effectively prevent any seepage of oil.

Another object of the invention is to provide a seal retaining member having a positioning flange for retaining a coil spring about an axially extending flange of the sealing member.

Other objects and advantages of the invention will be more apparent from the following description taken in connection with the accompanying drawing in which.

Figure 1:
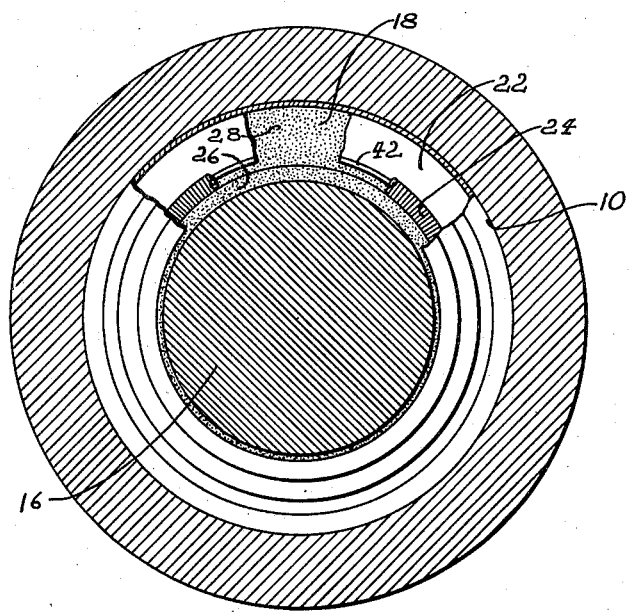
Fig. 1 is an end view of the seal shown in Fig. 2 taken on the line I—I of Fig. 2, parts being broken away and in section.
Figure 2:
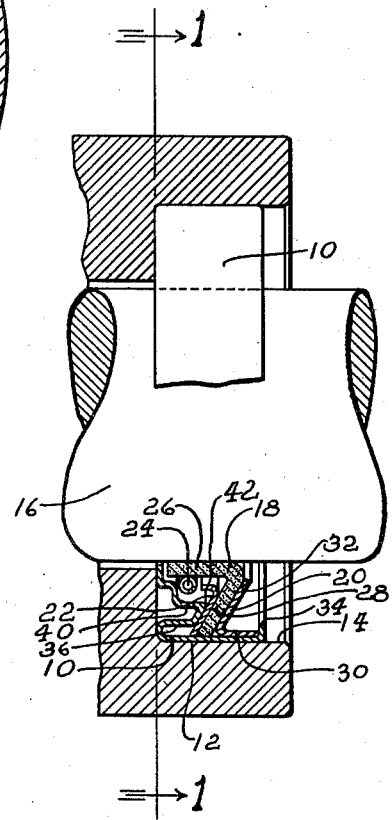
Fig. 2 is a sectional view through a housing equipped with a seal embodying the invention, showing the seal partly in section and partly in side elevation.

Referring to the drawing, I have shown an outside sheet metal stamping 10 which is provided with an outer axially extending portion 12 forming the outer wall for the seal and which may be pressed into an opening 14 in a housing surrounding a rotating shaft 16.

Within the annular space formed by the outer wall 12 I have provided a pliable sealing ring 18, preferably formed of leather, a metallic spacer ring 20, a metallic locking washer 22, and an endless coil pressure spring 24. The sealing ring 18 comprises an axially extending flange portion 26 of substantial length with its outer periphery directly engaging the outer periphery of the shaft 16. The ring 18 is also provided with a substantially radially extending flange portion 28, the outer end of which extends in a direction toward the free end of the flange 26 and bears against the inner periphery of the outer casing 12. In other words, the sealing ring 18 is provided with two flanges having an arcuate angle therebetween.

The spacer ring 20 has flanges 30 and 32, one of which 30 parallels the outer casing 12 and rests against the inner periphery thereof and the other flange 32 extends radially toward the shaft 16, forming an acute angle with the flange 30. The flange 32 has its outer face in direct engagement with the outer face of the sealing ring 18.

The outer free end of the flange 30 abuts a radially extending flange 34 on the outer end of the wall 12.

The end wall of the housing 10 is reversely bent as at 36 overlapping a portion of the wall 12 and is extended inwardly and parallels the flange 28 of the sealing ring 18 for a short distance where it is again reversely bent as at 40 and parallels the wall 12 and reversely bent portion 36 to provide an annular space between the portion 40 and the radially extending flange 26 of the sealing 18 for reception of the spring 24. The lower end of the wall, beyond the end of the portion 40, is formed Z-shaped so that one arm of the Z provides an end wall for the spring 24, and the other arm of the Z provides an end wall for the free end of the flange 26 of the sealing ring 18. The last mentioned arm of the Z is in substantially radial alignment with the inner end of the reversely bent portion 36. The general shape of the housing is substantially rectangular, having a straight wall at 12 and two inwardly pressed portions in its inner end wall, one portion serving as a means to compress the flange 28 of the sealing ring 18 against the flange 32 of the ring 20 and another portion providing a retaining wall for the spring 24.

The locking washer 22 is positioned between the end wall of the housing and the flange 28 and extends substantially parallel throughout its major portion to the flange 28, the inner end of the washer being flanged as at 42 extending toward the spring 24. This flange serves the purpose of positioning the spring 24 at the free end of the flange 26.

By the arrangement and design of the parts as above described I have been able to provide a seal of minimum parts and having a substantially wide bearing surface within the opening 14, a substantially long bearing portion on the shaft 16, and a means for retaining the spring 24 at the free end of the substantially long flange 26.

Various changes, including the size, shape and arrangement of parts, may be made without departing from the spirit of my invention and it is not my intention to limit its scope other than by the terms of the appended claims.

What I claim is:

1. A lubricant retainer comprising an annular housing having an axially extending peripheral portion, a radially extending flange at one edge of the axially extending peripheral portion, an angular member having an axially extending flange fitted within the axially extending flange of said housing with its free edge in engagement with said radially extending flange, and a diagonal flange extending inwardly from the opposite edge of said last named axially extending flange, a pliable angular member having an axially extending flange and a diagonal flange extending outwardly in parallel relation to said first named diagonal flange and in contact therewith, a washer having a portion parallel to and in contact with the diagonal flange of said pliable member and an axially extending flange parallel to but spaced from the axially extending flange of said pliable member the end of which terminates short of the end of said axially extending flange of said pliable member, a coil spring around the axially extending flange of said pliable member beyond the axially extending flange of said washer, and a closed end portion on said housing having a portion in engagement with said washer.

2. A lubricant retainer comprising a pliable packing member having an axially extending flange and a radially extending flange, a housing for said packing securing the radially extending flange of said packing between portions of said housing, a coil spring surrounding the axially extending portion of said packing, and axially extending means for positioning said spring axially at the free end of said axially extending flange between said housing and the radially extending portion of said packing.

3. A lubricant retainer comprising a pliable packing member having an axially extending flange and a radially extending flange, oppositely arranged angular members on the opposite sides of said radially extending flange, one of said angular members having an axially extending flange surrounding and spaced from the axially extending flange of said pliable member, a housing for said members having its opposite end walls in engagement with said angular members, and a coil spring within said housing surrounding the axially extending flange of said pliable member and spaced axially between an end wall of said housing and the free end of the axially extending flange of one of the angular members.

SIMPSON C. LEONARD, Jr.